(12) United States Patent
Morris et al.

(10) Patent No.: US 10,640,304 B2
(45) Date of Patent: May 5, 2020

(54) METHOD AND APPARATUS FOR LOCATING A PREFORM ON A MOLD

(71) Applicant: CORNING INCORPORATED, Corning, NY (US)

(72) Inventors: Kevin Thomas Morris, Hammondsport, NY (US); Andrew Nathan Nassau, Philadelphia, PA (US); Michael George Shultz, Lowman, NY (US); Matthew John Towner, Campbell, NY (US); Kevin William Uhlig, Horseheads, NY (US); Ljerka Ukrainczyk, Painted Post, NY (US); Thomas Achille Yorio, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 878 days.

(21) Appl. No.: 14/966,471

(22) Filed: Dec. 11, 2015

(65) Prior Publication Data
US 2016/0167894 A1    Jun. 16, 2016

Related U.S. Application Data

(60) Provisional application No. 62/240,108, filed on Oct. 12, 2015, provisional application No. 62/091,816, filed on Dec. 15, 2014.

(51) Int. Cl.
*B65G 47/90*    (2006.01)
*B29C 31/00*    (2006.01)
(Continued)

(52) U.S. Cl.
CPC .......... *B65G 47/905* (2013.01); *B29C 31/008* (2013.01); *C03B 23/023* (2013.01);
(Continued)

(58) Field of Classification Search
CPC . B65G 47/905; C03B 23/202; C03B 23/0357; C03B 23/023; B29C 31/008; Y10S 901/46
(Continued)

(56) References Cited

U.S. PATENT DOCUMENTS 4,118,197 A * 10/1978 Mackintosh .......... C30B 15/002
117/211
5,226,942 A    7/1993 Letemps et al.
(Continued)

FOREIGN PATENT DOCUMENTS

CN    103753526 A    4/2014
CN    203610877 U    5/2014
(Continued)

OTHER PUBLICATIONS

Robotshop.com screen capture (Year: 2014).*
(Continued)

*Primary Examiner* — Ronald P Jarrett
(74) *Attorney, Agent, or Firm* — John P. McGroarty

(57) ABSTRACT

An apparatus for locating a preform on a mold includes a preform handling tool and a force sensor coupled to the preform handling tool such that the force sensor is capable of sensing forces applied to the preform during handling of the preform by the preform handling tool. The apparatus includes a control device that is arranged and operable to move the preform handling tool relative to the mold. A method of locating the preform on the mold includes picking up the preform using the preform handling tool and placing the preform in a vicinity of the mold. Positions on the mold are mapped with an edge of the preform with the aid of the force sensor. The preform is paced on the mold according to the mapped positions.

19 Claims, 6 Drawing Sheets

(51) Int. Cl.
    *C03B 23/023*    (2006.01)
    *C03B 23/035*    (2006.01)
    *C03B 35/20*    (2006.01)
(52) U.S. Cl.
    CPC ........ *C03B 23/0357* (2013.01); *C03B 35/202* (2013.01); *C03B 2215/61* (2013.01); *C03B 2225/02* (2013.01)
(58) Field of Classification Search
    USPC .............................. 901/46; 73/706, 760–860
    See application file for complete search history.

(56) References Cited

U.S. PATENT DOCUMENTS

| | | | |
|---|---|---|---|
| 8,701,443 | B2 | 4/2014 | Bailey et al. |
| 8,924,006 | B2 | 12/2014 | Amsden et al. |
| 2012/0297828 | A1 | 11/2012 | Bailey et al. |
| 2013/0061695 | A1* | 3/2013 | Sato ...................... B25J 13/085 73/865 |
| 2013/0136565 | A1 | 5/2013 | Amsden et al. |
| 2014/0167343 | A1 | 6/2014 | Lu |
| 2014/0271058 | A1 | 9/2014 | Nitschke et al. |
| 2014/0373951 | A1* | 12/2014 | Griffin, Jr. ............ F15D 1/0015 137/808 |

FOREIGN PATENT DOCUMENTS

| | | |
|---|---|---|
| CN | 103909196 A | 7/2014 |
| JP | 11230701 | 8/1999 |
| JP | 2002011684 A | 1/2002 |
| JP | 2004238104 | 8/2004 |
| JP | 2014233806 A | 12/2014 |

OTHER PUBLICATIONS

International Search Report and Written Opinion of the International Searching Authority; PCT/US2015/064672; dated April 22, 2016.
English Translation of TW104141565 Office Action and Search Report dated Mar. 25, 2019, Taiwan Patent Office, 3 Pgs.
Chinese Patent Application No. 201580076083.5; English Translation of the First Office Action dated Sep. 19, 2019; China Patent Office; 11 Pgs.
Japanese Patent Application No. 2017531906; Machine Translation of the Office Action dated Dec. 25, 2019; Japan Patent Office; 3 Pgs.

* cited by examiner

METHOD AND APPARATUS FOR LOCATING A PREFORM ON A MOLD

CROSS-REFERENCE TO RELATED APPLICATIONS

This application claims the benefit of priority under 35 U.S.C. § 119 of U.S. Provisional Application Ser. No. 62/240,108 filed on Oct. 12, 2015 and U.S. Provisional Application Ser. No. 62/091,816 filed on Dec. 15, 2014, the content of each is relied upon and incorporated herein by reference in its entirety.

FIELD

The present disclosure relates generally to shaping of glass or glass-ceramic preforms into three-dimensional (3D) shapes by vacuum forming or other flat glass/glass-ceramic reforming method. More specifically, the present disclosure relates to a method of locating a preform on a mold with repeatable accuracy.

BACKGROUND

Consumer electronic manufacturers increasingly view three-dimensional (3D) shaped glass or glass-ceramic components as differentiating design elements that will enable them to continue to evolve their device designs and generate ongoing interest from the marketplace. To service this market, glass manufacturers and component suppliers have developed several competing processes to form 3D shapes from flat glass preforms. These solutions include double-mold processes, such as pressing, where molds contact both sides of the preform, and one-mold processes, such as vacuum forming and pressure forming, where a mold contacts only one side of the preform.

A high throughput precision 3D glass forming process (double-mold pressing, single-mold vacuum forming, or single-mold pressure forming) having a short Takt time can enable lower cost manufacturing. "Takt time" is average unit production time needed to meet customer demand. One of the challenges with reducing Takt time is maintaining the required precision of 2D preform placement. Short Takt time can be more readily achieved in single-mold processes. In double-mold processes, there is high friction between the upper and lower molds due to a need to maintain tight tolerances while pressing the glass. Because of this high friction it is not possible to apply fast pressing action.

Precise preform placement on the mold is required in order to meet tight specifications on the outer periphery of 3D parts and specifically to reduce variability and achieve accuracy in length, width, and height dimensions of the 3D parts. If the preform is placed on the mold inaccurately, the 3D part may still have good compliance to the CAD model in contour dimensions but because of its length, width or height may be out of tolerance and the 3D part may not fit into the final device. Typical tolerances for length, width, and height dimensions range from +/−0.050 mm to +/−0.150 mm. For a 3D part to meet these tolerances, the preform must be placed on the mold with even tighter tolerance, typically within +/−0.050 mm or better, depending on exact specification requirements and the flat preform tolerances.

Traditional part locating/sensing techniques are not capable of meeting all the technical requirements of this application. Machine vision systems, for example, are not tolerant of the high ambient temperatures present above the mold in the forming process. When placed in a location with ambient temperatures that satisfy camera temperature specifications, existing vision systems generally do not have the resolution required to satisfy the micron-level positioning requirements for this application. Vision systems also require very specific lighting that is very difficult to achieve in the preform's glass edge and are further complicated by the changing mold finish due to the surface oxidation that occurs in mold materials at process temperatures.

SUMMARY

An apparatus and method for locating a preform on a mold with the aid of a force sensor are disclosed. The apparatus and method may include provisions for maintaining the force sensor at a safe temperature during the process of locating the preform on the mold.

In one illustrative embodiment, an apparatus for locating a preform on a mold includes a preform handling tool, a force sensor coupled to the preform handling tool such that the force sensor is capable of sensing forces applied to the preform during handling of the preform by the preform handling tool, and a control device is arranged and operable to move the preform handling tool relative to the mold. The control device may include a robot arm or other suitable machine that can provide controlled motion to the preform handling tool.

In another illustrative embodiment, a method for locating a preform on a mold includes providing a preform handling tool coupled to a force sensor, picking the preform up with the preform handling tool and placing the preform in a vicinity of the mold, mapping positions on the mold with an edge of the preform with the aid of the force sensor, and placing the preform on the mold according to the mapped positions.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

An apparatus for locating a preform, for example a glass or glass-ceramic substrate, on a mold is disclosed herein. A method of using the apparatus to locate a preform on a mold is also disclosed. The apparatus can be used to precisely locate the preform on the mold within +/−0.050 mm or better of a desired location. In one example, the mold may be a heated mold on a continuous forming machine wherein the mold is indexed between multiple mold positions, as disclosed in U.S. Pat. No. 8,701,443, which is hereby incorporated by reference in its entirety. In one embodiment, the apparatus locates the preform on the mold with the aid of a force sensor. The force sensor is used to map positions on the mold to the edge of the preform in order to accurately position the preform on the mold.

Figure 1:
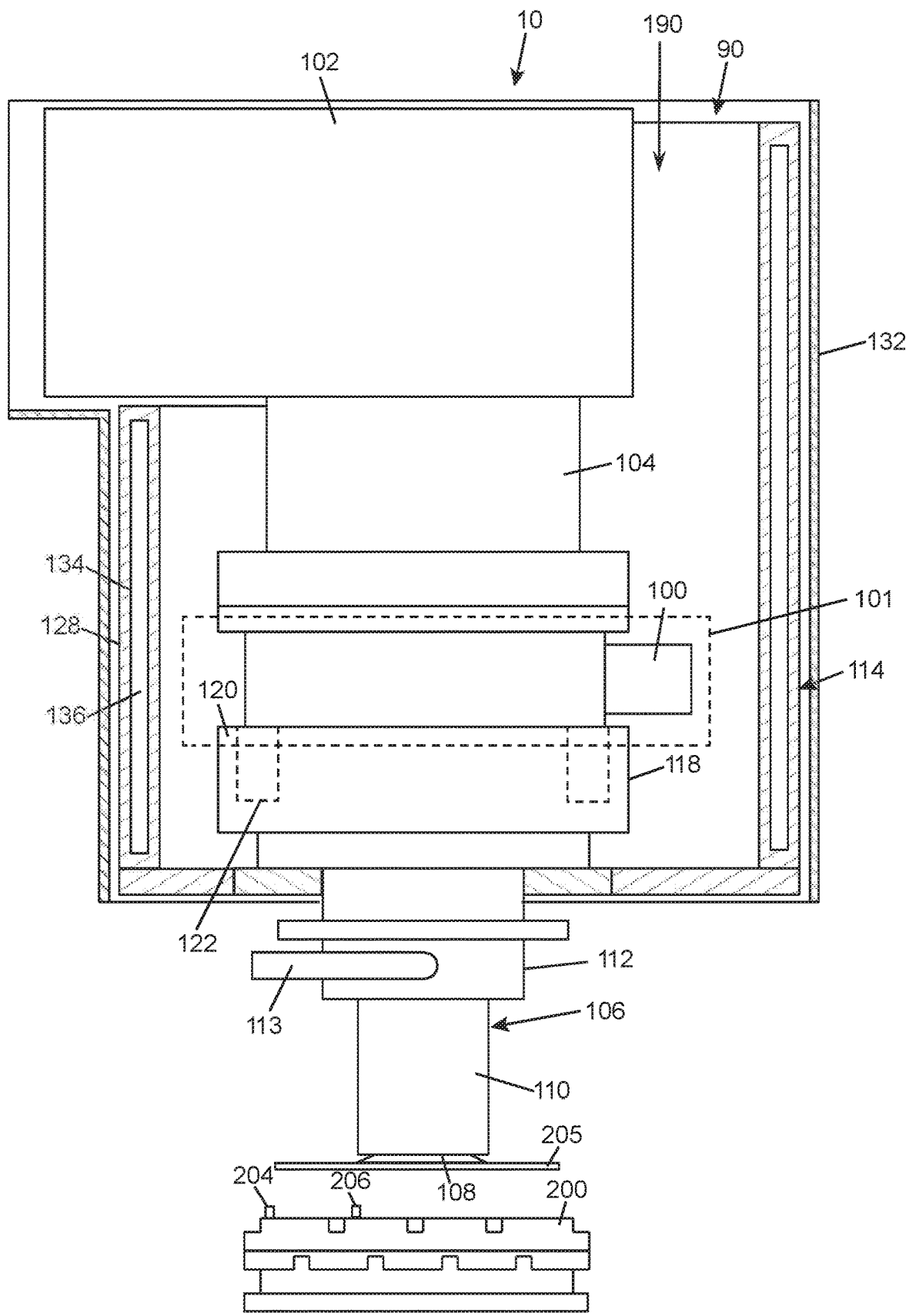
FIG. 1 shows an exemplary robot preform loading system according to one embodiment.

FIG. 1 shows an apparatus 10 for locating a preform on a mold according to one embodiment. The apparatus 10 includes a preform handling assembly 90, which is coupled to a robot arm 102. In one embodiment, the preform handling assembly 90 includes a force sensor 100, which may be coupled to the robot arm 102 via a force sensor adapter plate 104. The preform handling assembly 90 further includes a preform handling tool 106, which is coupled to the force sensor 100 so that forces on the preform handling tool 106 can be transmitted to the force sensor 100. In one embodiment, the preform handling tool 106 may include a vacuum (or suction) cup 108 for gripping a preform. The vacuum cup 108 may be attached to a vacuum cup stabilizer 110, which may be further attached to a vacuum cup adapter 112. The vacuum cup adapter 112 may include a port 113 to allow vacuum to be supplied to activate the vacuum cup 108. In another embodiment, the preform handling tool 106 may include a Bernoulli chuck (not shown), which would enable non-contact handling of a preform. Bernoulli chuck uses both vacuum and pressure to float and hold a substrate in place. Bernoulli chucks are available commercially, for example, Festo Bernoulli gripper made by Festo Corp. or Bernoulli vacuum end-effector made by Mechatronic.

Force sensors are available commercially. Some examples are FANUC Force Sensor FS-250iA, FS-100iA, FS-40iA, FS-15iA, and FS-15iAe available from Fanuc America Corporation, Rochester Hills, Mich. A force sensor available from Fanuc America Corporation or other suitable force sensor capable of detecting force and torque may be used as the force sensor 100. Some robot manufacturers, such as Fanuc America Corporation, offer intelligent robots with integrated force sensors. It is possible to use such an intelligent robot to satisfy the functions of the robot arm 102 and force sensor 100.

Force sensors are typically rated for temperatures less than 50° C. However, ambient temperatures at the preform load position may be well above 50° C., and may exceed 120° C. To prevent the force sensor from failing during the process of locating the preform on the mold, the preform handling assembly 90 may include a cooling arrangement 114 for the force sensor 100. In one embodiment, the cooling arrangement 114 creates a temperature-controlled bubble, exemplarily illustrated by dashed line 101, within the ambient environment. The force sensor 100 is located within the temperature-controlled bubble 101 and is thereby protected from the ambient process temperatures. The term "bubble" is used in the sense of "a place or position that is protected from danger or unpleasant reality." In one embodiment, the temperatures within the temperature-controlled bubble 101 are maintained below 60° C. by the cooling arrangement 114, which would enable the force sensor 100 to be within operating temperature specifications for standard, commercially available force sensors. In another embodiment, the temperatures within the temperature-controlled bubble 101 are maintained below 40° C. by the cooling arrangement 114.

Figure 1A:
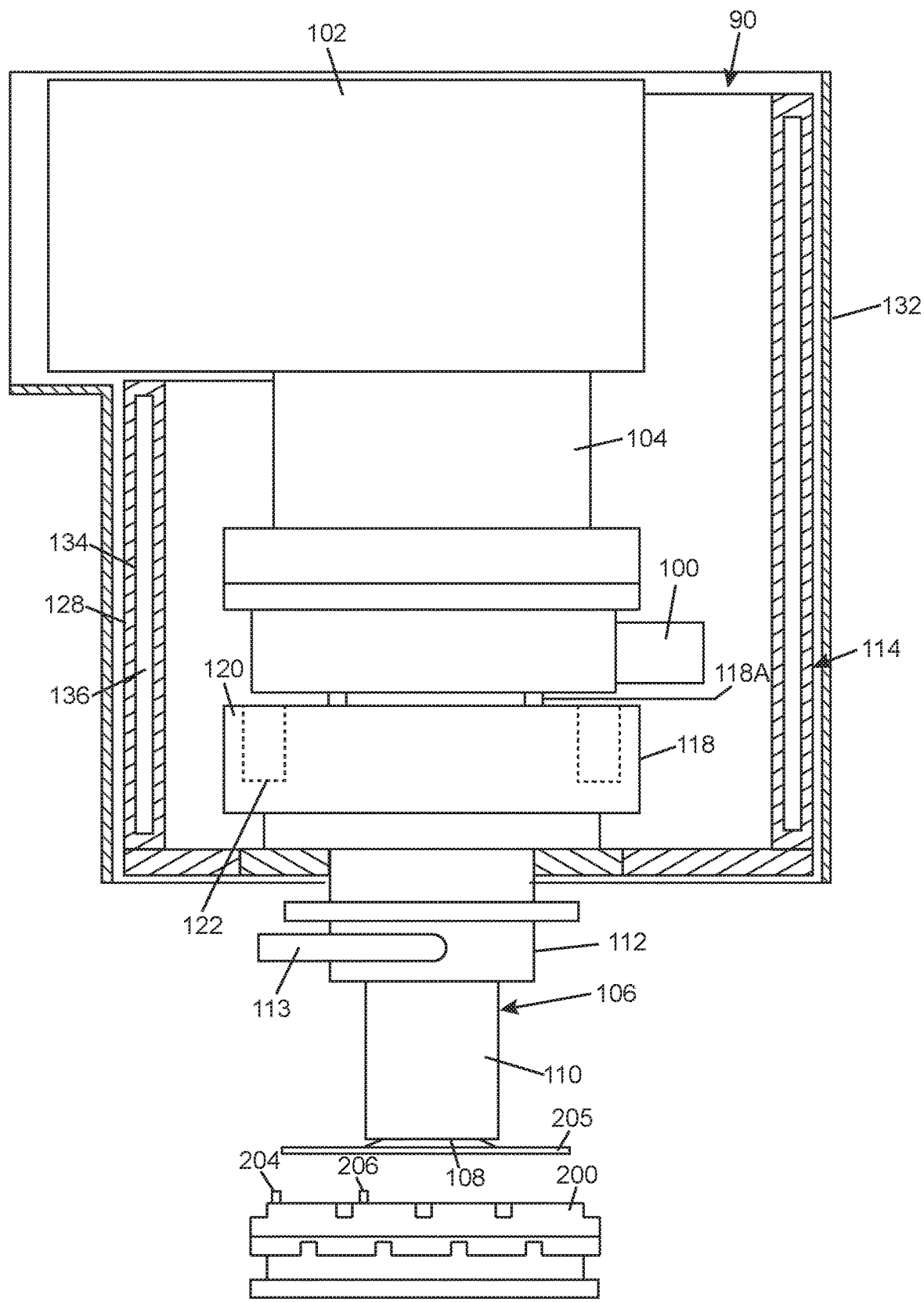
FIG. 1A shows exemplary standoffs between the force sensor and cooling plate of the robot preform loading system of FIG. 1 according to one embodiment.

In one embodiment, the cooling arrangement 114 may be operated while the preform handling tool 106 and force sensor 100 are being used to load a preform onto a mold. In one embodiment, the cooling arrangement 114, or a part thereof, may be located generally between the force sensor 100 and the preform handling tool 106. In one embodiment, the cooling arrangement 114 may include a cooling plate 118 arranged proximate to the force sensor 100. The cooling plate 118 may make physical contact with the force sensor 100, for example, by physically attaching the upper end of the cooling plate 118 to the force sensor 100, so that heat can be removed from the force sensor 100 primarily by conduction. In an alternate embodiment, standoffs (118A in FIG. 1A) may be arranged between the cooling plate 118 and the force sensor 100 to create a small gap across which heat can be removed from the force sensor 100 primarily by radiation. The lower end of the cooling plate 118 may be coupled to the preform handling tool 106, for example, by fastening the cooling plate 118 to the vacuum adapter 112 using any suitable means.

In one embodiment, the cooling plate 118 has a cooling plate chamber 122 inside of which chilled air (or other cooling fluid) is circulated in order to remove heat from the force sensor 100. In one embodiment, the cooling plate 118 may have a double wall 120 made of an inner wall and an outer wall, and the cooling plate chamber 122 may be located in the void within the double wall 120, i.e., the gap between the inner and outer walls of the double wall 120. In this embodiment, the circulating air is contained within the double wall 120, which would eliminate the possibility of air currents that could potentially lead to thermal gradients and corresponding dimensional defects in the final 3D shaped part formed from the preform or that could carry particles onto the mold that can lead to cosmetic defects in the final 3D shaped part.

Figure 2:
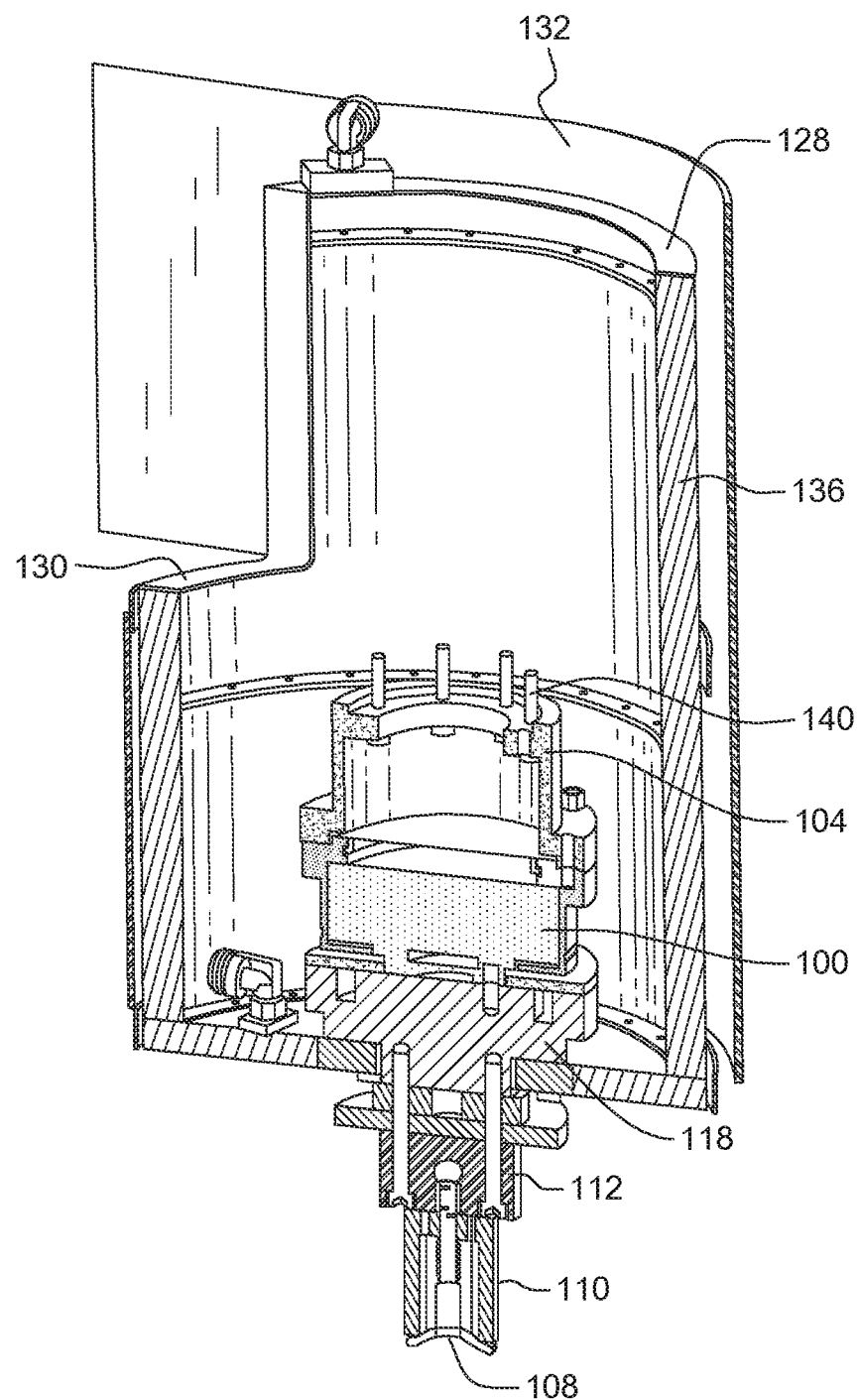
FIG. 2 shows a cut-away view of the preform handling tool of the robot preform loading system of FIG. 1.

In one embodiment, the cooling arrangement 114 may further include a cooling can 128 arranged to at least partially circumscribe the force sensor 100. The cooling can 128 may be attached, or otherwise coupled, to the force sensor 100 or to the cooling plate 118. In general, any suitable means of supporting the cooling can 128 such that it at least partially circumscribes the force sensor 100 may be used. The cooling can 128 may be a single can or may be made of a plurality of cans arranged side by side to at least partially circumscribe the force sensor 100. The cooling can 128 has a cooling can chamber 136. Chilled compressed air (or other compressed fluid) is circulated inside the cooling can chamber 136 in order to remove heat from around the force sensor 100. In one embodiment, the cooling can 128 has a double wall 134 made of an inner wall and an outer wall, and the cooling can chamber 136 is located in the void within the double wall 134, i.e., the void between the inner and outer walls of the double wall 134. The double wall 134 may act in much the same manner as earlier described for the cooling plate 118. The cooling can 128 may be made of aluminum or other suitable material, such as steel. In one embodiment, as shown in FIG. 2, the cooling can 128 may include a window 130 to accommodate the robot arm 102 when the robot arm 102 is coupled to the force sensor 100. The robot arm 102 may extend through the window 130 as shown.

As shown in FIGS. 1 and 2, the cooling arrangement 114 may further include a heat shield 132 mounted on the outside of the cooling can 128. The heat shield 132 may be used to block heat radiation directed towards the force sensor 100 from a furnace (not shown) or other similar heating source. The heat shield 132 may only be used on the part of the cooling can 128 that will face the source of heat radiation or may circumscribe the entire cooling can 128, with appropriate opening or clearance 190 (FIG. 1) for the robot arm 102. The heat shield 132 may be made of aluminum or other suitable heat shield material.

The cooling arrangement 114 may also include vortex tubes 140, shown in FIG. 2 being positioned for example within force sensor adapter plate 104, for providing additional spot cooling on the force sensor 100. A vortex tube spins compressed air to separate the air into cold and hot air streams. Examples of suitable vortex tubes are available from Vortec, Cincinnati, Ohio.

Returning to FIG. 1, the preform handling assembly 90 described above can be used to load a glass or glass-ceramic preform, or a preform made of other material, onto a mold for a sagging process to form the preform into a 3D part. Before loading the preform onto the mold, the preform will typically be preheated. To load the preform 205 on the mold 200, the robot arm 102 uses the preform handling tool 106 to pick the preform 205 from a preheat nest (not shown) and approaches the mold 200. The robot arm 102 then places the preform 205 close to the surface of the mold 200, and the process of locating the preform 205 on the mold 200 using the force sensor 100 begins. While locating the preform 205 on the mold 200, the cooling arrangement 114 is operated to provide the desired temperature-controlled bubble around the force sensor 100 so that the force sensor 100 is kept within a safe operating temperature range. The safe operating temperature range will be determined by the rating of the force sensor by the manufacturer. In one embodiment, the cooling arrangement 114 maintains the temperature of the force sensor 100 below the rated maximum operating temperature of the force sensor. In one embodiment, the cooling arrangement 114 maintains the temperature of the force sensor 100 below 60° C. In another embodiment, the cooling arrangement 114 maintains the temperature of the force sensor 100 below 40° C. Although not shown, sensors may be used to monitor the temperature within the temperature-controlled bubble, and the output of the sensors may be used to adjust the operation of the cooling arrangement 114.

Figure 3:
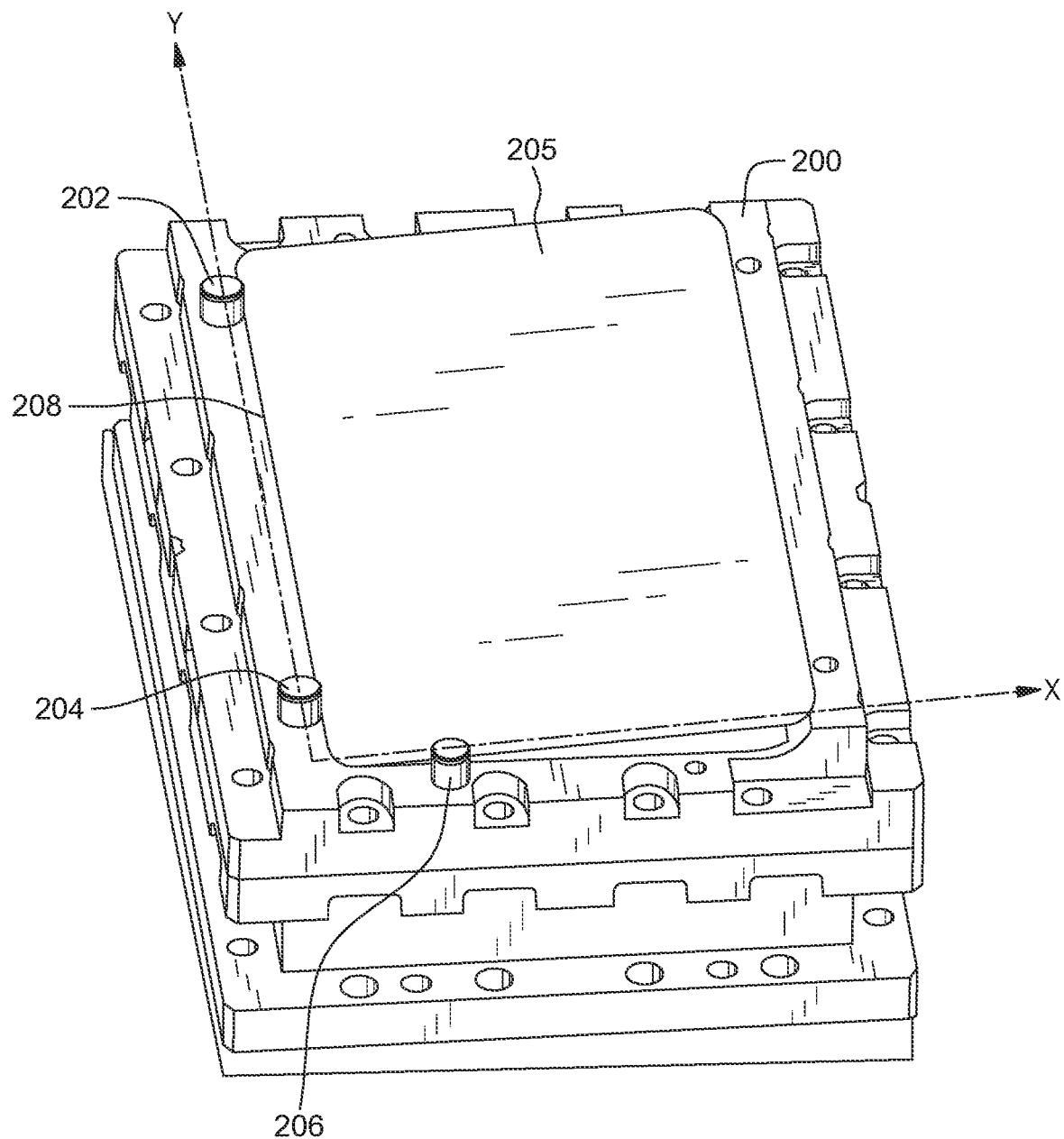
FIG. 3 shows an exemplary mold with locating pins.

FIG. 3 shows that in one embodiment the mold 200 on which the preform 205 is to be loaded has locating pins 202, 204, 206. Two pins 202, 204 are arranged along the Y-axis, and one locating pin 206 is arranged along the X-axis. That is, the three locating pins 202, 204, 206 are not collinear, or the three locating pins 202, 204, 206 form a triangle. To precisely position the preform 205 on the mold 200, the peripheral edge 208 of the preform 205 has to abut all these pins.

Figure 4:
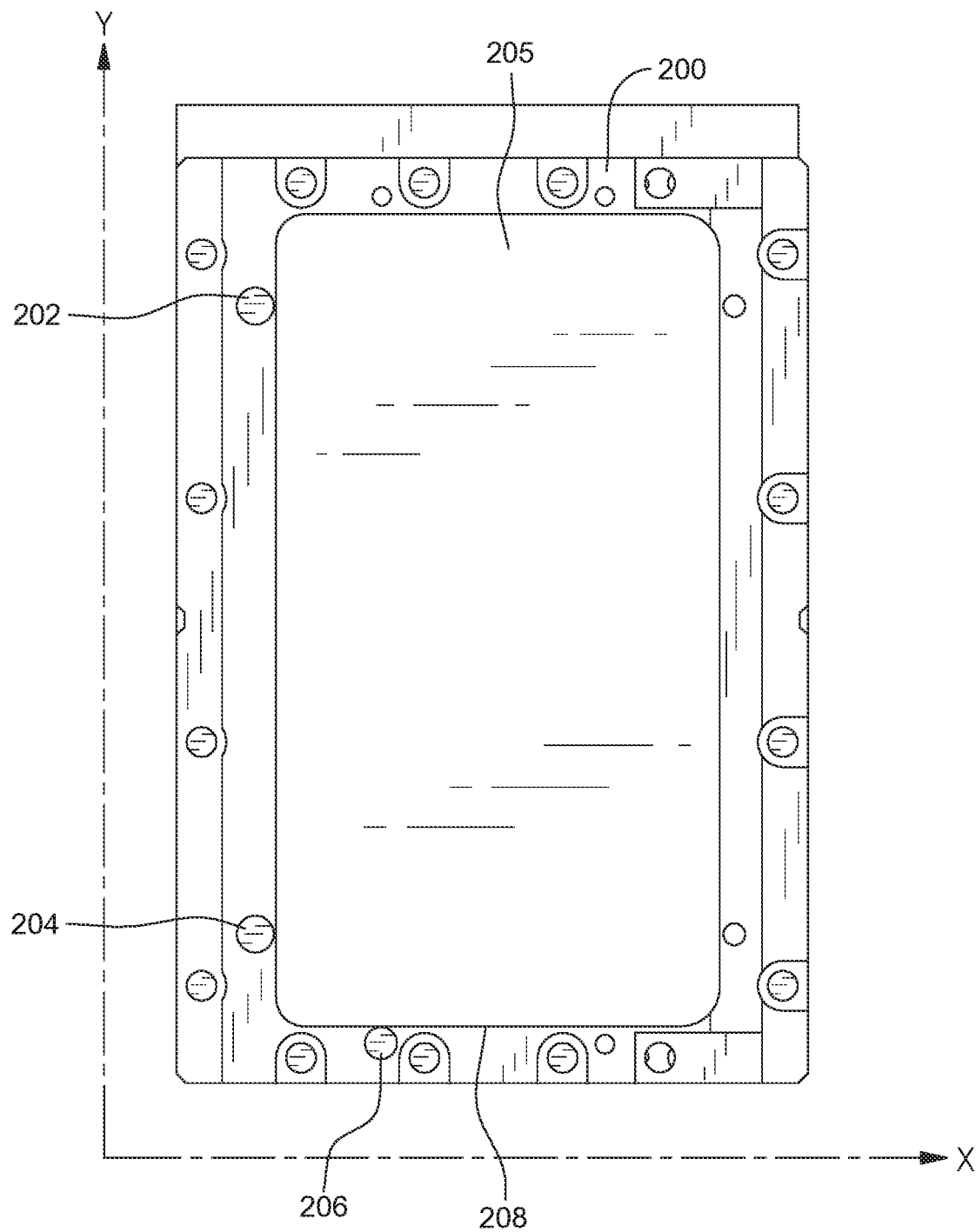
FIG. 4 shows an exemplary placement of a preform on a mold with locating pins.

Referring to FIG. 4, to precisely locate the preform 205 on the mold 200 according to one embodiment, the robot arm (102 in FIG. 1) may move along the Y-axis until the edge 208 of the preform 205 contacts the locating pin 206 on the X-axis. The force sensor (100 in FIG. 1) may be in the force mode, i.e., sensing force, for this move. Contact with the locating pin 206 may be confirmed when the force sensor registers a predetermined amount of force, for example, 4 N. The robot arm stops moving when the force sensor provides feedback that the locating pin 206 has been found.

The robot arm may reverse direction along the Y-axis and move the edge 208 of the preform 205 by a specific distance, e.g., 1 mm, from the locating pin 206. This distance is determined by the specific process features in the force sensor mode and the pin diameter.

The robot arm may then move along the X-axis until it contacts one of the pins 202, 204 on the Y-axis with the edge 208 of the preform 205. The force sensor may be on the force mode for this move. Contact is confirmed when the force sensor registers a predetermined amount of force, e.g., 4N. The robot arm stops moving when the force sensor provides feedback that it has found either of the pins 202, 204 on the Y-axis.

The force sensor may be placed into torque mode for the next move. The robot arm may search for the other pin 202 or 204 on the Y-axis by moving until it detects a moment from the pin previously found on the Y-axis (as described above). The robot arm may rotate in a direction to counteract this moment until the torque applied by the robot is canceled by an equal moment in the opposite direction. This condition is satisfied when both pins 202, 204 on the Y-axis are in contact with the edge 208 of the preform 205. The force sensor then provides feedback that both pins 202, 204 on the Y axis have been found.

A robot controller may be provided that communicates with the robot arm and force sensor. The robot controller may include a processor and network communication capabilities. Such a robot controller may be built or obtained from a commercial source. For example, System R-30iB Controller is available from Fanuc America Corporation. A program that when executed performs the steps described above can be implemented in the robot controller. The robot controller with the program can be used to move the robot arm as described above to locate the preform on the mold.

After the preform 205 has been located on the mold 200, the robot may release the preform 205 to the mold surface by turning off vacuum to the vacuum cup (108 in FIG. 1).

The application of the force sensor as described above allows the robot system to map each mold position with the edge of the preform being loaded onto it. This method allows the robot to compensate for all machine system tolerances, mold to mold variations, and preform to preform variations, and to position the preform on the mold with the level of precision and repeatability required to satisfy as-formed part dimensions. The entire operation of picking up the preform and performing the above movements typically needs to be completed within 15 seconds in order to maintain high throughput forming process.

Definitions

Cp is a measure of process capability. It is calculated as Cp=[USL−LSL]/6*(standard deviation of all data). Cpk is an index that measures how close a process is running to its specification limits relative to the natural variability of the process. Cpk=MINIMUM [(MEAN−LSL)/3*Standard Deviation), (USL−MEAN)/3*Standard Deviation)]. USL is the upper specification limit, LSL is the lower specification limit, and MEAN is the process mean of the data. The higher the Cp and Cpk for a process, the better. Cp and Cpk essentially show how well the process is controlled.

Example 1 (Comparative)

Figure 5:
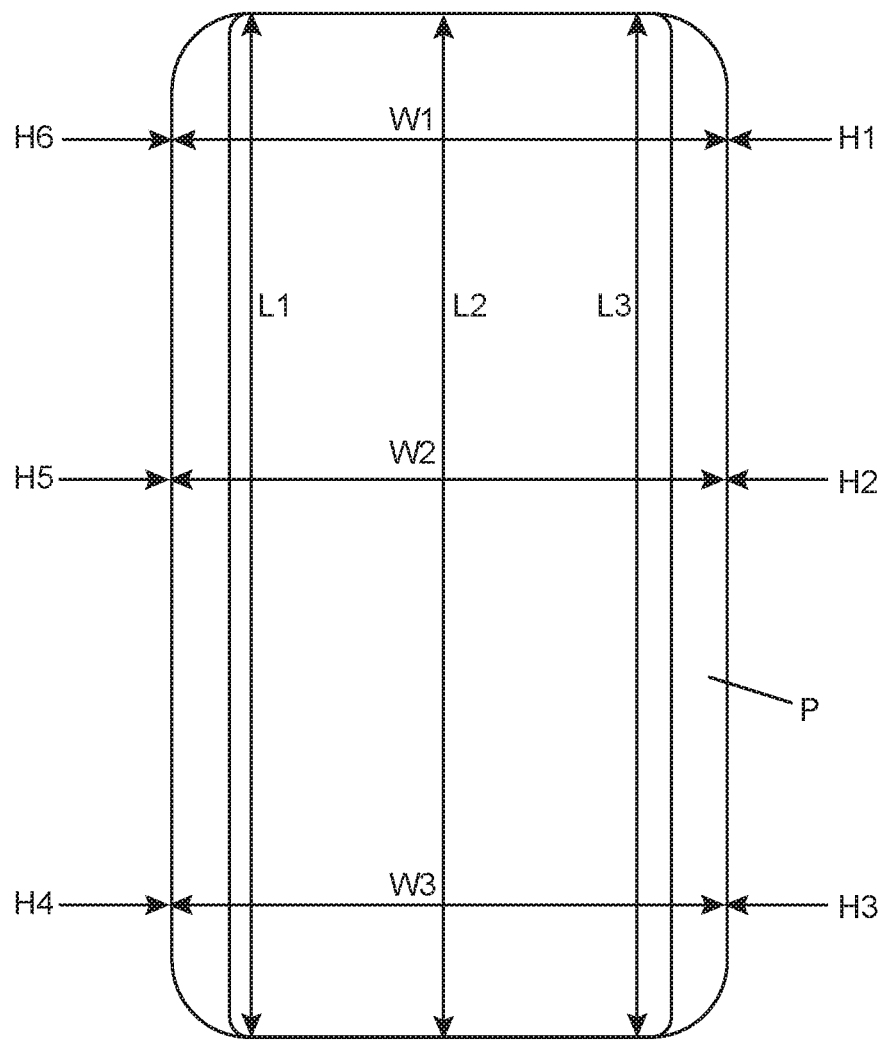
FIG. 5 shows exemplary definitions of dimensions of a model preform.

A Pneumatic Compliance Device by RAD, Ohio, was used to place preforms on molds in a 24-mold rotary indexing vacuum forming machine. The pneumatic compliance device works based on pressure response feedback without active computer motion control. In contrast, force sensor uses computer control and can detect the force and moment (x, y, z, yaw, pitch, and roll) applied to it from external sources. A force sensor typically has a much higher accuracy than a pneumatic compliance device. Table 1 shows Cp values for length (L1, L2, L3) and width (W1, W2, W3) dimensions. (FIG. 5 shows definition of L1, L2, L3, W1, W2, and W3 for preform model P.) The yield for length/width/height dimensions is below 50% (Cp<0.5).

TABLE 1

| Mold Position | Preform Sample | L1, Cp | L2, Cp | L3, Cp | W1, Cp | W2, Cp | W3, Cp |
|---|---|---|---|---|---|---|---|
| 2 | 37 | 1.785275 | 1.529446 | 0.641946 | 1.134109 | 1.491745 | 0.722662 |
| 3 | 121 | 1.720251 | 1.640185 | 0.7574 | 1.495465 | 1.762255 | 1.091833 |
| 5 | 69 | 1.954395 | 1.138856 | 0.483047 | 0.531901 | 1.076902 | 1.030495 |
| 7 | 58 | 1.603819 | 1.437182 | 0.600017 | 1.227705 | 1.326766 | 0.111325 |
| 9 | 167 | 1.871995 | 1.932116 | 1.024404 | 1.679955 | 1.384465 | 0.121761 |
| 10 | 126 | 2.1032 | 2.289782 | 1.105586 | 1.88679 | 1.574993 | 0.813746 |
| 11 | 139 | 2.157179 | 2.21788 | 1.260021 | 1.335823 | 1.983858 | 1.344793 |
| 12 | 146 | 2.083564 | 1.847093 | 0.933285 | 1.100164 | 1.556569 | 0.934814 |
| 14 | 166 | 1.680975 | 2.113601 | 1.162109 | 1.399101 | 1.461173 | 0.994594 |
| 16 | 156 | 2.188903 | 2.037877 | 1.032273 | 1.391736 | 1.573105 | 0.894103 |
| 17 | 146 | 2.114989 | 1.442046 | 0.677754 | 1.551679 | 1.402968 | 0.876939 |
| 18 | 127 | 2.07948 | 2.153407 | 1.210916 | 1.160389 | 1.64096 | 0.925854 |
| 19 | 136 | 2.155458 | 1.782689 | 0.792394 | 1.45865 | 1.460594 | 0.165595 |
| 20 | 122 | 1.763875 | 1.643255 | 0.86238 | 1.120832 | 1.414321 | 0.867091 |
| 21 | 111 | 1.851414 | 1.75481 | 0.968757 | 1.517406 | 1.34262 | 0.141767 |
| 23 | 16 | 1.126173 | 0.108813 | 0.443626 | 0.900315 | 1.134559 | 1.115177 |
| 24 | 167 | 1.789293 | 1.906257 | 0.963739 | 1.667926 | 1.282475 | 0.768723 |

Example 2

A force sensor (FANUC FS-15iA) was used to place performs on molds in a 24-mold rotary indexing vacuum forming machine, where each preform placement was according to the process described above with reference to FIG. 4. Tables 2A and 2B show Cp values for length (L1, L2, L3), height (H1, H2, H3, H4, H5, H6), and width (W1, W2, W3) dimensions. (The definitions of L1, L2, L3, H1, H2, H3, H4, H5, H6, W1, W2, and W3 are shown in FIG. 5.) For all positions tested, Cp was greater than or equal to 0.99 (equivalent to 93% yield), which is a significant improvement over the comparative Example 1. The force sensor uses computer control and can detect the force and moment (x, y, z, yaw, pitch, and roll) applied to it from external sources. A force sensor typically has a much higher accuracy than a pneumatic compliance device, which may explain the significant improvement in Cp over Example 1.

TABLE 2A

| | H1 | H2 | H3 | H4 | H5 | H6 |
|---|---|---|---|---|---|---|
| Spec | +/−0.125 | +/−0.125 | +/−0.125 | +/−0.125 | +/−0.125 | +/−0.125 |
| Upper Spec | 1.028 | 1.028 | 1.028 | 5.685 | 5.685 | 5.685 |
| Target | 0.903 | 0.903 | 0.903 | 5.56 | 5.56 | 5.56 |
| Lower Spec | 0.778 | 0.778 | 0.778 | 5.435 | 5.435 | 5.435 |
| Mold Position | -First Test- | | | | | |
| 1 | 5.72 | 7.33 | 4.76 | 1.37 | 1.57 | 1.44 |
| 2 | 8.11 | 10.16 | 6.33 | 1.63 | 1.86 | 1.80 |
| 3 | 6.26 | 8.14 | 7.58 | 1.54 | 1.73 | 1.55 |
| 4 | 5.86 | 5.47 | 3.81 | 0.99 | 1.26 | 1.20 |
| 8 | 6.56 | 8.13 | 6.35 | 1.30 | 1.59 | 1.68 |
| 9 | 8.26 | 5.68 | 7.93 | 1.65 | 1.77 | 1.74 |
| All Mold Positions | 5.89 | 6.54 | 5.05 | 1.28 | 1.50 | 1.34 |
| Mold Position | -Second Test- | | | | | |
| 1 | 4.88 | 7.76 | 8.61 | 1.39 | 1.80 | 1.19 |
| 2 | 5.99 | 7.56 | 6.26 | 1.45 | 1.69 | 1.34 |
| 3 | 6.48 | 7.88 | 5.97 | 1.49 | 1.59 | 1.48 |
| 4 | 6.60 | 7.77 | 4.92 | 1.10 | 1.55 | 1.65 |
| 8 | 5.52 | 7.52 | 5.52 | 1.13 | 1.53 | 1.71 |
| 9 | 6.56 | 7.18 | 6.63 | 1.59 | 1.75 | 1.62 |
| 18 | 7.58 | 6.47 | 5.36 | 1.12 | 1.47 | 1.67 |
| All Mold Positions | 5.89 | 6.88 | 5.26 | 1.23 | 1.53 | 1.46 |

TABLE 2B

| | L1 | L2 | L3 | W1 | W2 | W3 | Shape |
|---|---|---|---|---|---|---|---|
| Spec | +/−0.08 | +/−0.08 | +/−0.08 | +/−0.1 | +/−0.1 | +/−0.1 | % of 91 points with Cp >= 1.0 |
| Upper Spec | 148.18 | 148.18 | 148.18 | 79.74 | 79.74 | 79.74 | |
| Target | 148.1 | 148.1 | 148.1 | 79.64 | 79.64 | 79.64 | |
| Lower Spec | 148.02 | 148.02 | 148.02 | 79.54 | 79.54 | 79.54 | |

TABLE 2B-continued

| Mold Position | -First Test- | | | | | | |
|---|---|---|---|---|---|---|---|
| 1 | 3.67 | 3.71 | 2.72 | 1.19 | 1.28 | 1.12 | 100% |
| 2 | 3.49 | 3.48 | 2.59 | 1.26 | 1.37 | 1.22 | 99% |
| 3 | 3.42 | 3.30 | 1.76 | 1.32 | 1.44 | 1.32 | 100% |
| 4 | 3.88 | 3.71 | 2.61 | 1.20 | 1.30 | 1.07 | 97% |
| 8 | 3.16 | 3.14 | 2.18 | 1.28 | 1.36 | 1.15 | 100% |
| 9 | 3.03 | 2.75 | 1.89 | 1.30 | 1.45 | 1.33 | 100% |
| All Mold Positions | 2.94 | 2.42 | 1.20 | 1.21 | 1.32 | 1.14 | 97% |

| Mold Position | -Second Test- | | | | | | |
|---|---|---|---|---|---|---|---|
| 1 | 3.55 | 3.54 | 2.75 | 1.25 | 1.29 | 1.08 | 100% |
| 2 | 3.28 | 2.94 | 2.01 | 1.25 | 1.35 | 1.23 | 100% |
| 3 | 3.75 | 3.28 | 2.14 | 1.31 | 1.36 | 1.20 | 99% |
| 4 | 3.37 | 2.95 | 1.99 | 1.26 | 1.30 | 1.05 | 100% |
| 8 | 2.79 | 2.81 | 2.08 | 1.23 | 1.32 | 1.14 | 100% |
| 9 | 2.85 | 2.76 | 1.87 | 1.21 | 1.38 | 1.25 | 100% |
| 18 | 3.49 | 3.18 | 2.20 | 1.32 | 1.33 | 1.09 | 99% |
| All Mold Positions | 3.04 | 2.57 | 1.35 | 1.24 | 1.30 | 1.09 | 100% |

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An apparatus for locating a preform on a mold, comprising:
a preform handling tool;
a force sensor coupled to the preform handling tool wherein the force sensor is capable of sensing forces applied to the preform during handling of the preform by the preform handling tool;
a cooling arrangement for creating a thermally-controlled bubble around the force sensor, the cooling arrangement comprising a cooling plate disposed between the force sensor and the preform handling tool, wherein the cooling plate is proximate to or in contact with the force sensor and the cooling plate comprises a cooling plate chamber inside of which chilled fluid is circulated to remove heat from the force sensor such that a temperature within the thermally-controlled bubble is less than 40° C.; and
a control device comprising a robot arm arranged and operable to move the preform handling tool relative to the mold.

2. The apparatus of claim 1, wherein the cooling arrangement is configured to maintain temperatures within the thermally-controlled bubble to below a rated maximum operating temperature of the force sensor.

3. The apparatus of claim 1, wherein the cooling arrangement further comprises a cooling can arranged to at least partially circumscribe the force sensor.

4. The apparatus of claim 3, wherein the cooling can has a double wall, and wherein a cooling can chamber for circulation of cooling fluid is located within the double wall.

5. The apparatus of claim 4, wherein the robot arm is coupled to the force sensor, and wherein the cooling can comprises a clearance for the robot arm.

6. The apparatus of claim 3, wherein the cooling arrangement further comprises a heat shield mounted proximate the cooling can to block external heat radiation directed towards the force sensor.

7. The apparatus of claim 1, wherein the cooling plate has a double wall, and the cooling plate chamber is located within the double wall.

8. The apparatus of claim 1, wherein the cooling arrangement further comprises at least one vortex tube arranged proximate the force sensor for spot cooling of the force sensor.

9. The apparatus of claim 1, wherein the force sensor is coupled to the robot arm.

10. The apparatus of claim 1, wherein a temperature of the preform handling tool is greater than 50° C.

11. A method of locating a preform on a mold using the apparatus of claim 1, comprising:
providing the preform handling tool coupled to the force sensor;
picking the preform up with the preform handling tool and placing the preform in a vicinity of the mold;
mapping positions on the mold with at least one edge of the preform with the aid of the force sensor; and placing the preform on the mold according to the mapped positions.

12. The method of claim 11, further comprising maintaining the force sensor at safe temperatures by providing the thermally-controlled bubble around the force sensor during the mapping positions and maintain temperatures within the thermally-controlled bubble to below a rated maximum operating temperature of the force sensor.

13. The method of claim 12, wherein the mapping positions comprises moving the preform relative to the mold and monitoring an output of the force sensor for an indication of a contact between the preform and a set of locating pins on the mold.

14. The method of claim 13, wherein the mapping positions comprises moving the preform along a first axis until the force sensor registers contact between the at least one edge of the preform and a first locating pin on a second axis transverse to the first axis.

15. The apparatus of claim 14, wherein the mapping positions further comprises moving the preform along the second axis until the force sensor registers contact between the at least one edge of the preform and a second locating pin on the first axis.

16. The method of claim 15, wherein the mapping positions further comprises rotating the preform until the force sensor registers contact between the at least one edge of the preform and both the second locating pin and a third locating on the first axis.

17. The method of claim 12, wherein providing the thermally-controlled bubble around the force sensor comprises selectively cooling the force sensor.

18. The method of claim 12, wherein providing the thermally-controlled bubble around the force sensor comprises providing a heat shield to block external heat radiation directed towards the force sensor.

19. The method of claim 12, wherein maintaining the force sensor at safe temperatures comprises maintaining temperatures within the thermally-controlled bubble below 40° C. through one or both of cooling the force sensor and shielding the force sensor from external heat radiation.

* * * * *